Patented Oct. 8, 1940

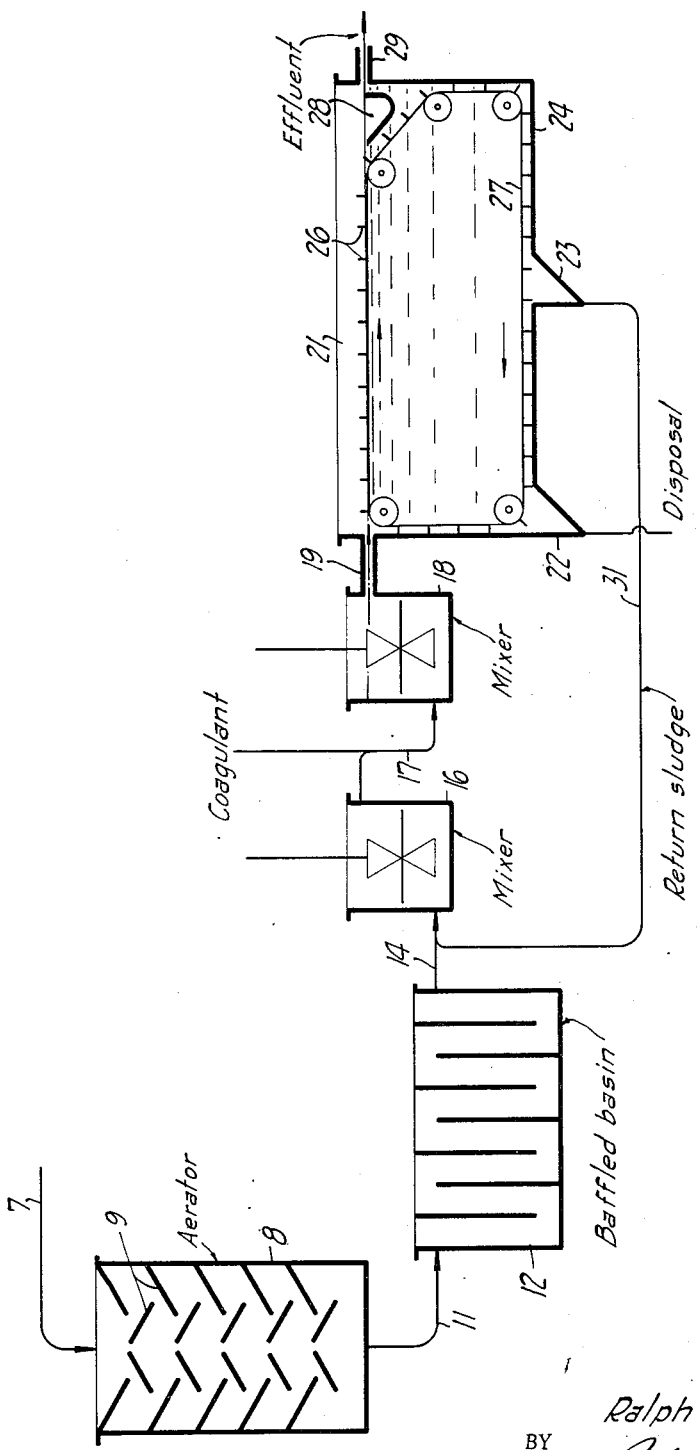
Oct. 8, 1940. R. A. STEVENSON 2,217,143
PURIFICATION OF PETROLEUM CONTAMINATED WATERS
Filed Sept. 21, 1937
INVENTOR.
Ralph A. Stevenson
BY Robert H. Eckhoff
ATTORNEY.

2,217,143

UNITED STATES PATENT OFFICE 2,217,143

PURIFICATION OF PETROLEUM CONTAMINATED WATERS

Ralph A. Stevenson, Los Angeles, Calif., assignor, by mesne assignments, to The Dow Chemical Company, Midland, Mich., a corporation of Michigan Application September 21, 1937, Serial No. 164,884

4 Claims. (Cl. 210—2)

This invention relates to the purification of oil well waste waters and other waters contaminated by petroleum, particularly crude petroleum or refinery wastes. While these waters contain only relatively small quantities of oil their purification has heretofore presented a special and unusual problem, and for which no simple, cheap solution was provided until the present invention. The term oil well waste water is used herein and in the claims as referring to water contaminated with crude petroleum and the like to some extent.

Heretofore oil well waste water has been treated first by aeration and then by passage through a baffle basin wherein heavy oil was skimmed off and the water passed into a retention basin of several days capacity. This treatment was effective in reducing the oil content of the water to the order of one hundred parts per million by weight and less. The waste water containing this relatively small amount of oil, when held in the retention basin, resulted in the formation of a gelatinous flocculent precipitate which settled to the bottom, gathering and retaining oil as it fell. During retention, these flocculent and gelatinous masses were released from the bottom and floated to the top, whereat the oil was released suddenly and in large masses, so that the effluent was at times contaminated by relatively large masses of oil, of the order of one thousand parts per million and greater. When this effluent was released into bays, sloughs, and into the ocean a pollution problem was presented of a very serious nature. Release of the flocculent gelatinous masses was attended by hydrogen sulfide. This material is of course objectionable because of atmospheric pollution, corrosion and extreme harm to marine life.

As public attention became directed to the matter, search for a solution for the problem became intensified and it was proposed to increase the size of the retention basins so that the waste water could be held for a greater length of time. I have determined that this proposal would not only be ineffective, but in fact would aggravate the objectionable condition. The gelatinous flocculent precipitate which forms, I have now determined, results from the action of an organism, probably a schizomycetes, which can feed upon the sulfur in the oil. I have determined that if the oil is removed from the water, then the gelatinous and flocculent precipitate does not form, and the water remains inoffensive. Removal of the oil I achieve by any economical process. Having removed the oil, the bacteria have nothing to feed upon, and the water therefore remains inoffensive. The form of bacteria present is not the ordinary sulfur-splitting bacteria, because this type of bacteria will feed upon and will increase by utilization of the sulfate content of the water. I have successfully used a process which does not alter appreciably the dissolved sulfate content, thus apparently proving the point that the sulfur upon which the bacteria feed is in the oil.

In practicing the process of the present invention upon petroleum waste waters, the waste water can be readily rendered suitable for discharge as an innocuous effluent by removal of the oil, because this removes the food source for the bacteria. The oil can be removed by any suitable means, or by any suitable treatment and when removed the water remains sweet, free of $H_2S$ and a free oxygen content can be maintained. I prefer to use the process illustrated diagrammatically in the single figure in the drawing.

Oil well waste water from a source is delivered through line 7 into suitable aeration means indicated by the aeration tank 8. This is so constructed that the water is aerated without further emulsifying free oil in the water. I have found that by permitting the water to discharge and flow gently over a series of baffles 9, the water can be thoroughly aerated without increasing the emulsified oil content. The aerated waste water is discharged through line 11 into a baffled basin indicated at 12, wherein free oil rises and is readily skimmed off. Effluent water is discharged from the basin through line 14 into a mixing tank 16, the purpose of which will be presently described in further detail.

A suitable coagulant is added through the effluent line 17, extending from mixer 16 to a second mixer 18. As a suitable coagulant I prefer to use ferric chloride, although any other suitable coagulant such as ferric sulfate, chlorinated copperas, alum, an iron or aluminum containing material providing a source for ferric or aluminum chloride upon chlorination can be employed. In mixer 18 the coagulant is suitably incorporated into the waste water, to secure maximum flocculation and distribution of the coagulant, the mixer operating at such a speed that the maximum floc is developed with a minimum of aeration of the floc, so that the floc settles readily upon release of the effluent from line 19 into a basin indicated generally at 21. The basin 21 includes separate sludge collecting means as troughs 22 and 23, and suitable means for moving sludge settling on the bottom 24 of basin 21 into one of the sludge collecting means. The sludge moving means usually comprises sweeps 26, carried upon endless chains 27 which are moved in the direction of the arrows to sweep the sludge collecting on basin bottom 24 into collecting trough 22 or 23.

A floating oil collecting gutter 28 is also provided to float off and collect any oil forced into it by sweeps 26. Effluent water passes out through line 29 and is ordinarily innocuous and substantially free of oil. The retention capacity of the basin 21 is ordinarily only from 2 to 4 hours, at a maximum.

It is not necessary to utilize a second collecting means 23, although, if this is not used, and if the sludge is not returned to the incoming waste water, as will be presently described in detail, the oil effluent will run from three to seven parts per million. Returning the sludge through line 31 to line 14, the return sludge and the incoming waste water being mixed in mixer 16, enables the oil content to be reduced to approximately a part per million and the coagulant dosage reduced by about 10%. The sludge collected in the sludge collector 22 is removed for suitable disposal, being burned quite conveniently because this sludge contains enough oil to burn.

The coagulant dosage required is small, from ½ to 1 grain of ferric chloride per gallon usually sufficing.

The distance between sludge collecting means 22 and 23 can be varied. The heaviest sludge will of course collect closest to the release of the stream into the settling basin, while the lighter sludge will collect farther from the point of entry of the stream into basin 21. The distance between sludge collecting troughs 22 and 23 is therefore selected to give the waste desired. The location of trough 23 from trough 22 is usually one-third to one-half the way down the basin.

In treating refinery wastes, it is usually necessary to adjust the pH. Refinery wastes frequently contain acids and alkali wastes and wash waters, and these can be suitably mixed or the pH otherwise adjusted so that it falls within the desired range of 6 to 8, or within that range within which a suitable floc can be built up upon addition of the coagulant.

It will be found that the water released from the basin 21 is substantially free of sulfide. In fact, if the process is properly operated, free oxygen will be present. This obviates the difficulties previously encountered with the retention basin operation which released water having a high soluble sulfide content, which was reduced to $H_2S$, a material highly corrosive to concrete and metals and objectionable from an atmosphere pollution standpoint. The presence of $H_2S$ in the water is also highly undesirable because of its destruction of marine life, fish, mollusks and crustaceans.

The present process obviates another difficulty in that by removing the oil, formation of the gelatinous, flocculent precipitate is avoided. This is a further advantage because this precipitate acts as a binder for suspended matter and causes scale formation. Pipes and conduits utilized to handle the precipitate carrying water quickly became encrusted with scale to such an extent that their capacity was materially reduced.

Water leaving basin 12 through line 14 may have such a low oil content that it can be permissibly discharged into a larger body of water, a stream, slough, river, or the ocean. However, because the bacteria remain $H_2S$ is subsequently generated. Sufficient $H_2S$ can exist in the presence of free oxygen to an extent and for a period sufficient to be extremely harmful to marine life. If the water is discharged directly from line 14 it is therefore desirable to kill the bacteria and thus ensure that $H_2S$ is not subsequently generated. This can be achieved by sterilization with chlorine, bromine, iodine, chloramine, a hypochlorite, hypochlorous acid or other sterilizing agent. Chlorination with from five to twenty parts per million usually suffices. Rendering the bacteria ineffective, either by removal of their food, the oil, or by sterilizing the water with oil remaining, permits and enables a free oxygen content to be maintained. This last is highly important for preservation of marine life to which $H_2S$ is highly poisonous. While free oxygen can exist for a short time in the presence of $H_2S$, it is rapidly exhausted by $H_2S$ generation and the two are incompatible over a period of time.

I claim:

1. A process for purifying and rendering stable a water contaminated with crude petroleum oil or waste petroleum oil from refineries of crude petroleum, and the oil containing sulfur on which bacteria can feed to form in the water an objectionable product such as gelatinous sludge or hydrogen sulfide, said process comprising aerating said water, skimming free oil from the aerated water to reduce the oil content to about fifty parts per million, adding a coagulant to said skimmed water and flocculating said coagulant, settling said water containing said flocculated coagulant to produce a sludge and reduce the free oil content thereof to the order of about three parts per million whereby said water is rendered substantially innocuous.

2. A process for purifying and rendering stable a water contaminated with crude petroleum oil or waste petroleum oil from refineries of crude petroleum, the oil containing sulfur on which bacteria can feed to form in the water an objectionable product such as gelatinous sludge or hydrogen sulfide, said process comprising aerating said water, skimming free oil from the aerated water to reduce the oil content to about fifty parts per million, adding a coagulant to said skimmed water and flocculating said coagulant, settling said water containing said flocculated coagulant to settle a sludge therefrom, removing said sludge and mixing at least a portion of said sludge with said skimmed aerated water.

3. A process for purifying and rendering stable a water contaminated with crude petroleum oil or waste petroleum oil from refineries of crude petroleum, and also contaminated with sulfur on which bacteria can feed to form in the water an objectionable product such as gelatinous sludge or hydrogen sulfide, said process comprising aerating said water, skimming free oil from the aerated water to reduce the oil content to about fifty parts per million, adding a coagulant to said skimmed water and flocculating said coagulant, settling said water containing said flocculated coagulant to settle a first sludge and a second sludge from said water, separating said sludges from the water and returning said second sludge to mix with skimmed aerated water.

4. A process for purifying and rendering stable a water contaminated with crude petroleum oil or waste petroleum oil from refineries of crude petroleum, the oil containing sulfur on which bacteria can feed to form in the water an objectionable product such as gelatinous sludge or hydrogen sulfide, said process comprising mixing and flocculating a coagulant in said water and settling said water containing coagulant to separate from said water substantially all petroleum oil therein to remove the source of food for said bacteria.

RALPH A. STEVENSON.

CERTIFICATE OF CORRECTION.

Patent No. 2,217,143.  October 8, 1940.

RALPH A. STEVENSON.

It is hereby certified that error appears in the printed specification of the above numbered patent requiring correction as follows: Page 2, second column, line 29, claim 1, strike out the word "and"; and that the said Letters Patent should be read with this correction therein that the same may conform to the record of the case in the Patent Office.

Signed and sealed this 12th day of November, A. D. 1940.

(Seal)

Henry Van Arsdale,
Acting Commissioner of Patents.